(12) United States Patent
Diard

(10) Patent No.: US 8,780,122 B2
(45) Date of Patent: Jul. 15, 2014

(54) TECHNIQUES FOR TRANSFERRING GRAPHICS DATA FROM SYSTEM MEMORY TO A DISCRETE GPU

(75) Inventor: Franck Diard, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 381 days.

(21) Appl. No.: 13/103,274

(22) Filed: May 9, 2011

(65) Prior Publication Data

US 2011/0210976 A1 Sep. 1, 2011

Related U.S. Application Data

(63) Continuation-in-part of application No. 12/649,317, filed on Dec. 29, 2009, and a continuation-in-part of application No. 12/651,395, filed on Dec. 31, 2009.

(60) Provisional application No. 61/243,155, filed on Sep. 16, 2009, provisional application No. 61/243,164, filed on Sep. 17, 2009.

(51) Int. Cl.
*G06F 15/16* (2006.01)
*G06T 1/00* (2006.01)
*G06T 15/00* (2011.01)
*G06F 9/44* (2006.01)

(52) U.S. Cl.
USPC .......................... 345/502; 345/522; 719/322

(58) Field of Classification Search
CPC ..... G06T 1/20; G06T 15/005; G06T 2210/52; G09G 5/363; G06F 13/102; G06F 13/105
See application file for complete search history.

(56) References Cited

U.S. PATENT DOCUMENTS

| 4,603,400 | A | 7/1986 | Daniels |
| 4,955,066 | A | 9/1990 | Notenboom |
| 5,016,001 | A | 5/1991 | Minagawa et al. |
| 5,321,510 | A | 6/1994 | Childers et al. |
| 5,371,847 | A | 12/1994 | Hargrove |
| 5,461,679 | A | 10/1995 | Normile et al. |
| 5,517,612 | A | 5/1996 | Dwin et al. |

(Continued)

OTHER PUBLICATIONS

"Epson; EMP Monitor V4, 10 Operation Guide", by Seiko Epson Corp., 2006 http://support.epson.ru/products/manuals/100396/Manual/EMPMonitor.pdf.

(Continued)

*Primary Examiner* — Carlos Perromat

(57) ABSTRACT

A method for transferring graphics data includes receiving graphics data in the system memory. The graphics data may be loaded into system memory by and application from a mass storage device. One or more graphics commands associated with the graphics data may also be received. The graphics commands may also be received from the application. The graphics data in system memory is compressed in response to receipt of the one or more graphics commands before the graphics data is transferred to a discrete graphics processing unit. The one or more received graphics commands are transferred to the discrete graphics processing unit. The one or more graphics commands include an operation to copy the compressed graphics data to the discrete graphics processing unit. The compressed graphics data is copied from the system memory to memory of the graphics processing. The compressed graphics data is then decompressed by the graphics processing unit. Thereafter, the discrete graphics processing unit may perform one or more graphics operations on the transferred graphics data.

20 Claims, 12 Drawing Sheets

(56) References Cited

U.S. PATENT DOCUMENTS

| | | | |
|---|---|---|---|
| 5,572,649 A | 11/1996 | Elliott et al. | |
| 5,687,334 A | 11/1997 | Davis et al. | |
| 5,712,995 A | 1/1998 | Cohn | |
| 5,768,164 A | 6/1998 | Hollon, Jr. | |
| 5,781,199 A | 7/1998 | Oniki et al. | |
| 5,790,125 A | 8/1998 | Bui et al. | |
| 5,841,435 A | 11/1998 | Dauerer et al. | |
| 5,878,264 A | 3/1999 | Ebrahim | |
| 5,900,913 A | 5/1999 | Tults | |
| 5,917,502 A | 6/1999 | Kirkland et al. | |
| 5,923,307 A | 7/1999 | Hogle, IV | |
| 5,953,532 A | 9/1999 | Lochbaum | |
| 5,978,042 A | 11/1999 | Vaske et al. | |
| 6,008,809 A | 12/1999 | Brooks | |
| 6,018,340 A | 1/2000 | Butler et al. | |
| 6,025,841 A | 2/2000 | Finkelstein et al. | |
| 6,025,853 A | 2/2000 | Baldwin | |
| 6,075,531 A | 6/2000 | DeStefano | |
| 6,078,339 A | 6/2000 | Meinerth et al. | |
| 6,191,758 B1 | 2/2001 | Lee | |
| 6,208,273 B1 | 3/2001 | Dye et al. | |
| 6,226,237 B1 | 5/2001 | Chan et al. | |
| 6,259,460 B1 | 7/2001 | Gossett et al. | |
| 6,337,747 B1 | 1/2002 | Rosenthal | |
| 6,359,624 B1 | 3/2002 | Kunimatsu | |
| 6,388,671 B1 | 5/2002 | Yoshizawa et al. | |
| 6,407,752 B1 | 6/2002 | Harnett | |
| 6,473,086 B1 | 10/2002 | Morein et al. | |
| 6,480,198 B2 | 11/2002 | Kang | |
| 6,483,502 B2 | 11/2002 | Fujiwara | |
| 6,483,515 B1 | 11/2002 | Hanko | |
| 6,498,721 B1 | 12/2002 | Kim | |
| 6,557,065 B1 | 4/2003 | Peleg et al. | |
| 6,600,500 B1 | 7/2003 | Yamamoto | |
| 6,628,243 B1 | 9/2003 | Lyons et al. | |
| 6,628,309 B1 | 9/2003 | Dodson et al. | |
| 6,630,943 B1 | 10/2003 | Nason et al. | |
| 6,654,826 B1 | 11/2003 | Cho et al. | |
| 6,657,632 B2 | 12/2003 | Emmot et al. | |
| 6,724,403 B1 | 4/2004 | Santoro et al. | |
| 6,753,878 B1 | 6/2004 | Heirich et al. | |
| 6,774,912 B1 | 8/2004 | Ahmed et al. | |
| 6,784,855 B2 | 8/2004 | Matthews et al. | |
| 6,816,977 B2 | 11/2004 | Brakmo et al. | |
| 6,832,269 B2 | 12/2004 | Huang et al. | |
| 6,832,355 B1 | 12/2004 | Duperrouzel et al. | |
| 6,871,348 B1 | 3/2005 | Cooper | |
| 6,952,217 B1 * | 10/2005 | Diard et al. | 345/562 |
| 6,956,542 B2 | 10/2005 | Okuley et al. | |
| 7,007,070 B1 | 2/2006 | Hickman | |
| 7,010,755 B2 | 3/2006 | Anderson et al. | |
| 7,030,837 B1 | 4/2006 | Vong et al. | |
| 7,034,776 B1 | 4/2006 | Love | |
| 7,036,089 B2 | 4/2006 | Bauer | |
| 7,103,850 B1 | 9/2006 | Engstrom et al. | |
| 7,124,360 B1 | 10/2006 | Drenttel et al. | |
| 7,127,745 B1 | 10/2006 | Herse et al. | |
| 7,129,909 B1 | 10/2006 | Dong et al. | |
| 7,149,982 B1 | 12/2006 | Duperrouzel et al. | |
| 7,212,174 B2 | 5/2007 | Johnston et al. | |
| 7,269,797 B1 | 9/2007 | Bertocci et al. | |
| 7,359,998 B2 | 4/2008 | Chan et al. | |
| 7,486,279 B2 | 2/2009 | Wong et al. | |
| 7,509,444 B2 | 3/2009 | Chiu et al. | |
| 7,546,546 B2 | 6/2009 | Lewis-Bowen et al. | |
| 7,552,391 B2 | 6/2009 | Evans et al. | |
| 7,558,884 B2 | 7/2009 | Fuller et al. | |
| 7,590,713 B2 | 9/2009 | Brockway et al. | |
| 7,612,783 B2 | 11/2009 | Koduri et al. | |
| 7,783,985 B2 | 8/2010 | Indiran et al. | |
| 8,054,314 B2 * | 11/2011 | Kelley et al. | 345/502 |
| 8,176,155 B2 | 5/2012 | Yang et al. | |
| 8,190,707 B2 | 5/2012 | Trivedi et al. | |
| 2001/0028366 A1 | 10/2001 | Ohki et al. | |
| 2002/0054141 A1 | 5/2002 | Yen et al. | |
| 2002/0057295 A1 | 5/2002 | Panasyuk et al. | |
| 2002/0087225 A1 | 7/2002 | Howard | |
| 2002/0128288 A1 | 9/2002 | Kyle et al. | |
| 2002/0129288 A1 | 9/2002 | Loh et al. | |
| 2002/0140627 A1 | 10/2002 | Ohki et al. | |
| 2002/0163513 A1 | 11/2002 | Tsuji | |
| 2002/0175933 A1 | 11/2002 | Ronkainen et al. | |
| 2002/0182980 A1 | 12/2002 | Van Rompay | |
| 2002/0186257 A1 | 12/2002 | Cadiz et al. | |
| 2002/0196279 A1 | 12/2002 | Bloomfield et al. | |
| 2003/0016205 A1 | 1/2003 | Kawabata et al. | |
| 2003/0025689 A1 | 2/2003 | Kim | |
| 2003/0041206 A1 | 2/2003 | Dickie | |
| 2003/0058248 A1 * | 3/2003 | Hochmuth et al. | 345/537 |
| 2003/0065934 A1 | 4/2003 | Angelo et al. | |
| 2003/0088800 A1 | 5/2003 | Cai | |
| 2003/0090508 A1 | 5/2003 | Keohane et al. | |
| 2003/0105812 A1 | 6/2003 | Flowers, Jr. et al. | |
| 2003/0126335 A1 | 7/2003 | Silvester | |
| 2003/0160816 A1 | 8/2003 | Zoller et al. | |
| 2003/0177172 A1 | 9/2003 | Duursma et al. | |
| 2003/0179240 A1 | 9/2003 | Gest | |
| 2003/0179244 A1 | 9/2003 | Erlingsson | |
| 2003/0188144 A1 | 10/2003 | Du et al. | |
| 2003/0189597 A1 | 10/2003 | Anderson et al. | |
| 2003/0195950 A1 | 10/2003 | Huang et al. | |
| 2003/0197739 A1 | 10/2003 | Bauer | |
| 2003/0200435 A1 | 10/2003 | England et al. | |
| 2003/0208529 A1 | 11/2003 | Pendyala et al. | |
| 2003/0222876 A1 | 12/2003 | Giemborek et al. | |
| 2003/0222915 A1 | 12/2003 | Marion et al. | |
| 2003/0225872 A1 | 12/2003 | Bartek et al. | |
| 2003/0229900 A1 | 12/2003 | Reisman | |
| 2004/0001069 A1 | 1/2004 | Snyder et al. | |
| 2004/0019724 A1 | 1/2004 | Singleton, Jr. et al. | |
| 2004/0027315 A1 | 2/2004 | Senda et al. | |
| 2004/0066414 A1 | 4/2004 | Czerwinski et al. | |
| 2004/0070608 A1 | 4/2004 | Saka | |
| 2004/0080482 A1 | 4/2004 | Magendanz et al. | |
| 2004/0085328 A1 | 5/2004 | Maruyama et al. | |
| 2004/0095382 A1 | 5/2004 | Fisher et al. | |
| 2004/0145605 A1 | 7/2004 | Basu et al. | |
| 2004/0153493 A1 | 8/2004 | Slavin et al. | |
| 2004/0184523 A1 | 9/2004 | Dawson et al. | |
| 2004/0222978 A1 | 11/2004 | Bear et al. | |
| 2004/0224638 A1 | 11/2004 | Fadell et al. | |
| 2004/0225901 A1 | 11/2004 | Bear et al. | |
| 2004/0225907 A1 | 11/2004 | Jain et al. | |
| 2004/0235532 A1 | 11/2004 | Matthews et al. | |
| 2004/0260565 A1 | 12/2004 | Zimniewicz et al. | |
| 2004/0268004 A1 | 12/2004 | Oakley | |
| 2005/0025071 A1 | 2/2005 | Miyake et al. | |
| 2005/0059346 A1 | 3/2005 | Gupta et al. | |
| 2005/0064911 A1 | 3/2005 | Chen et al. | |
| 2005/0066209 A1 | 3/2005 | Kee et al. | |
| 2005/0073515 A1 | 4/2005 | Kee et al. | |
| 2005/0076088 A1 | 4/2005 | Kee et al. | |
| 2005/0076256 A1 | 4/2005 | Fleck et al. | |
| 2005/0091610 A1 | 4/2005 | Frei et al. | |
| 2005/0097506 A1 | 5/2005 | Heumesser | |
| 2005/0122333 A1 * | 6/2005 | Sumanaweera et al. | 345/502 |
| 2005/0125739 A1 | 6/2005 | Thompson et al. | |
| 2005/0132299 A1 | 6/2005 | Jones et al. | |
| 2005/0140566 A1 | 6/2005 | Kim et al. | |
| 2005/0168472 A1 | 8/2005 | Gosalia et al. | |
| 2005/0182980 A1 | 8/2005 | Sutardja | |
| 2005/0240538 A1 | 10/2005 | Ranganathan | |
| 2005/0240873 A1 | 10/2005 | Czerwinski et al. | |
| 2005/0262302 A1 | 11/2005 | Fuller et al. | |
| 2005/0268246 A1 | 12/2005 | Keohane et al. | |
| 2006/0001595 A1 | 1/2006 | Aoki | |
| 2006/0085760 A1 | 4/2006 | Anderson et al. | |
| 2006/0095617 A1 | 5/2006 | Hung | |
| 2006/0119602 A1 | 6/2006 | Fisher et al. | |
| 2006/0125784 A1 | 6/2006 | Jang et al. | |
| 2006/0129855 A1 | 6/2006 | Rhoten et al. | |
| 2006/0142878 A1 | 6/2006 | Banik et al. | |
| 2006/0150230 A1 | 7/2006 | Chung et al. | |
| 2006/0232494 A1 | 10/2006 | Lund et al. | |

(56) References Cited

U.S. PATENT DOCUMENTS

| | | |
|---|---|---|
| 2006/0267857 A1 | 11/2006 | Zhang et al. |
| 2006/0267987 A1 | 11/2006 | Litchmanov |
| 2006/0267992 A1 | 11/2006 | Kelley et al. |
| 2006/0282604 A1 | 12/2006 | Temkine et al. |
| 2006/0282855 A1 | 12/2006 | Margulis |
| 2007/0043890 A1* | 2/2007 | Miller ............... 710/68 |
| 2007/0050727 A1 | 3/2007 | Lewis-Bowen et al. |
| 2007/0129990 A1 | 6/2007 | Tzruya et al. |
| 2007/0195099 A1 | 8/2007 | Diard et al. |
| 2007/0273699 A1 | 11/2007 | Sasaki et al. |
| 2008/0034318 A1 | 2/2008 | Louch et al. |
| 2008/0130543 A1 | 6/2008 | Singh et al. |
| 2008/0155478 A1 | 6/2008 | Stross |
| 2008/0158233 A1* | 7/2008 | Shah et al. ............ 345/501 |
| 2008/0303846 A1 | 12/2008 | Brichter et al. |
| 2009/0153540 A1* | 6/2009 | Blinzer et al. ........... 345/212 |
| 2009/0160865 A1 | 6/2009 | Grossman |
| 2009/0167785 A1 | 7/2009 | Wong |
| 2009/0172707 A1 | 7/2009 | Huang et al. |
| 2010/0169666 A1 | 7/2010 | Dewan et al. |
| 2010/0207957 A1 | 8/2010 | Taneja et al. |
| 2011/0219313 A1 | 9/2011 | Mazzaferri |

OTHER PUBLICATIONS

"Virtual Network Computing", http://en.wikipedia.org/wiki/Vnc, Downloaded Circa: Dec. 18, 2008, pp. 1-4.

Andrew Fuller; "Auxiliary Display Platform in Longhorn"; Microsoft Corporation; The Microsoft Hardware Engineering Conference Apr. 25-27, 2005; slides 1-29.

McFedries, ebook, titled "Complete Idiot's Guide to Windows XP", published Oct. 3, 2001, pp. 1-7.

PCWorld.com, "Microsoft Pitches Display for Laptop Lids" dated Feb. 10, 2005, pp. 1-2, downloaded from the Internet on Mar. 8, 2006 from http://www.pcworld.com/resources/article/aid/119644.asp.

Vulcan, Inc., "Product Features: Size and performance", p. 1; downloaded from the internet on Sep. 20, 2005 from http://www.flipstartpc.com/aboutproduct_features_sizeandpower.asp.

Vulcan, Inc., "Product Features:LID Module", p. 1, downloaded from the Internet on Sep. 19, 2005 from http://www.flipstartpc.com/aboutproduct_features_lidmodule.asp.

Vulcan, Inc., "Software FAQ", p. 1, downloaded from the internet on Sep. 20, 2005 from http://www.flipstartpc.com/faq_software.asp.

* cited by examiner

TECHNIQUES FOR TRANSFERRING GRAPHICS DATA FROM SYSTEM MEMORY TO A DISCRETE GPU

CROSS-REFERENCE TO RELATED APPLICATIONS

This application is a continuation-in-part of U.S. patent application Ser. No. 12/649,317 filed Dec. 29, 2009, and U.S. patent application Ser. No. 12/651,395 filed Dec. 21, 2009, both of which claim the benefit of U.S. Provisional Patent Application No. 61/243,155 filed Sep. 16, 2009 and U.S. Provisional Patent Application No. 61/243,164 filed Sep. 17, 2009, all of which are incorporated in their entirety herein by reference.

BACKGROUND OF THE INVENTION

Conventional computing systems may include a discrete graphics processing unit (dGPU) or an integral graphics processing unit (iGPU). The discrete GPU and integral GPU are heterogeneous because of their different designs. The integrated GPU generally has relatively poor processing performance compared to the discrete GPU. However, the integrated GPU generally consumes less power compared to the discrete GPU.

The conventional operating system does not readily support co-processing using such heterogeneous GPUs. Referring to FIG. 1, a graphics processing technique according to the conventional art is shown. When an application 110 starts, it calls the user mode level runtime application programming interface (e.g., DirectX API d3d9.dll) 120 to determine what display adapters are available. In response, the runtime API 120 enumerates the adapters that are attached to the desktop (e.g., the primary display 180). A display adapter 165, 175, even recognized and initialized by the operating system, will not be enumerated in the adapter list by the runtime API 120 if it is not attached to the desktop. The runtime API 120 loads the device driver interface (DDI) (e.g., user mode driver (umd.dll)) 130 for the GPU 170 attached to the primary display 180. The runtime API 120 of the operating system will not load the DDT of the discrete GPU 175 because the discrete GPU 175 is not attached to the display adapter. The DDI 130 configures command buffers of the graphics processor 170 attached to the primary display 180. The DDI 130 will then call back to the runtime API 120 when the command buffers have been configured.

Thereafter, the application 110 makes graphics requests to the user mode level runtime API (e.g., DirectX API d3d9.dll) 120 of the operating system. The runtime 120 sends graphics requests to the DDI 130 which configures command buffers. The DDI calls to the operating system kernel mode driver (e.g., DirectX driver dxgkrnl.sys) 150, through the runtime API 120, to schedule the graphics request. The operating system kernel mode driver then calls to the device specific kernel mode driver (e.g., kmd.sys) 150 to set the command register of the GPU 170 attached to the primary display 180 to execute the graphics requests from the command buffers. The device specific kernel mode driver 160 controls the GPU 170 (e.g., integral GPU) attached to the primary display 180.

In U.S. patent application Ser. No. 12/649,317 filed Dec. 29, 2009, and U.S. patent application Ser. No. 12/651,395 filed Dec. 21, 2009 various techniques for using the discrete GPU to process graphics data and commands are disclosed. When using the discrete GPU, graphics data and commands are transferred across one or more communication links such as peripheral component interface express buss. The transfer of graphics data and commands, however, may result in a bandwidth bottleneck on the communication link. Accordingly, there is a continuing need for improved techniques for transferring graphics data and commands across a communication link to the discrete graphics processing unit.

SUMMARY OF THE INVENTION

The present technology may best be understood by referring to the following description and accompanying drawings that are used to illustrate embodiments of the present technology.

Embodiments of the present technology are directed toward techniques for transferring graphics data from system memory to a discrete graphics processing unit. In one embodiment, a method for transferring graphics data includes receiving graphics data in the system memory. The graphics data may be loaded into system memory by an application from a mass storage device. One or more graphics commands associated with the graphics data may also be received from the application. The graphics data in system memory is compressed in response to receipt of the one or more graphics commands before the graphics data is transferred to the discrete graphics processing unit. The one or more received graphics commands are transferred to the discrete graphics processing unit. The one or more graphics commands include an operation to copy the compressed graphics data to the discrete graphics processing unit. In response to the copy operation in the graphics command, the compressed graphics data is copied from the system memory to memory of the discrete graphics processing unit. In one implementation, the data is compressed to copy the data across a relatively slow communication link, such as a 1X peripheral component interface express (PCIe) bus. The compressed graphics data is then decompressed by the graphics processing unit. The method may be implemented in software (e.g., computing device executable instructions stored in computing device readable media which when executed perform the method), firmware, hardware, or a combination of one or more thereof.

In another embodiment, the method of transferring graphics data includes receiving graphics data in the system memory. One or more graphics commands associated with the graphics data may also be received. Receiving the graphics data may include writes of the entire graphics data to system memory, or one or more update write to the graphics data in system memory. An amount of one or more portions of the graphics data that have changed in the system memory is determined. If the one or more portion of the graphics data that have changed are more than a predetermined amount, the one or more portions of the graphics data are compressed. The one or more received graphics commands are transferred to a discrete processing unit. One or more of the received graphics command include an operation to copy the compressed graphics data to the discrete graphics processing unit. If the one or more portion of the graphics data that have changed are more than the predetermined amount, the compressed one or more portions of the graphics data from the system memory are copied to memory of the discrete graphics processing unit. If the one or more portions of the graphics data that have changed are more than the predetermined amount, the compressed one or more portion of the data may be decompressed in-line with copying into the memory of the discrete graphics processing unit. If the one or more portions of the graphics data that have changed are not more than the predetermined amount, the one or more portion of the graphics data may be copied from the system memory to the memory of the graphics processing without compression. Again, the method may be implemented in software, firmware, hardware, or a combination of one or more thereof.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
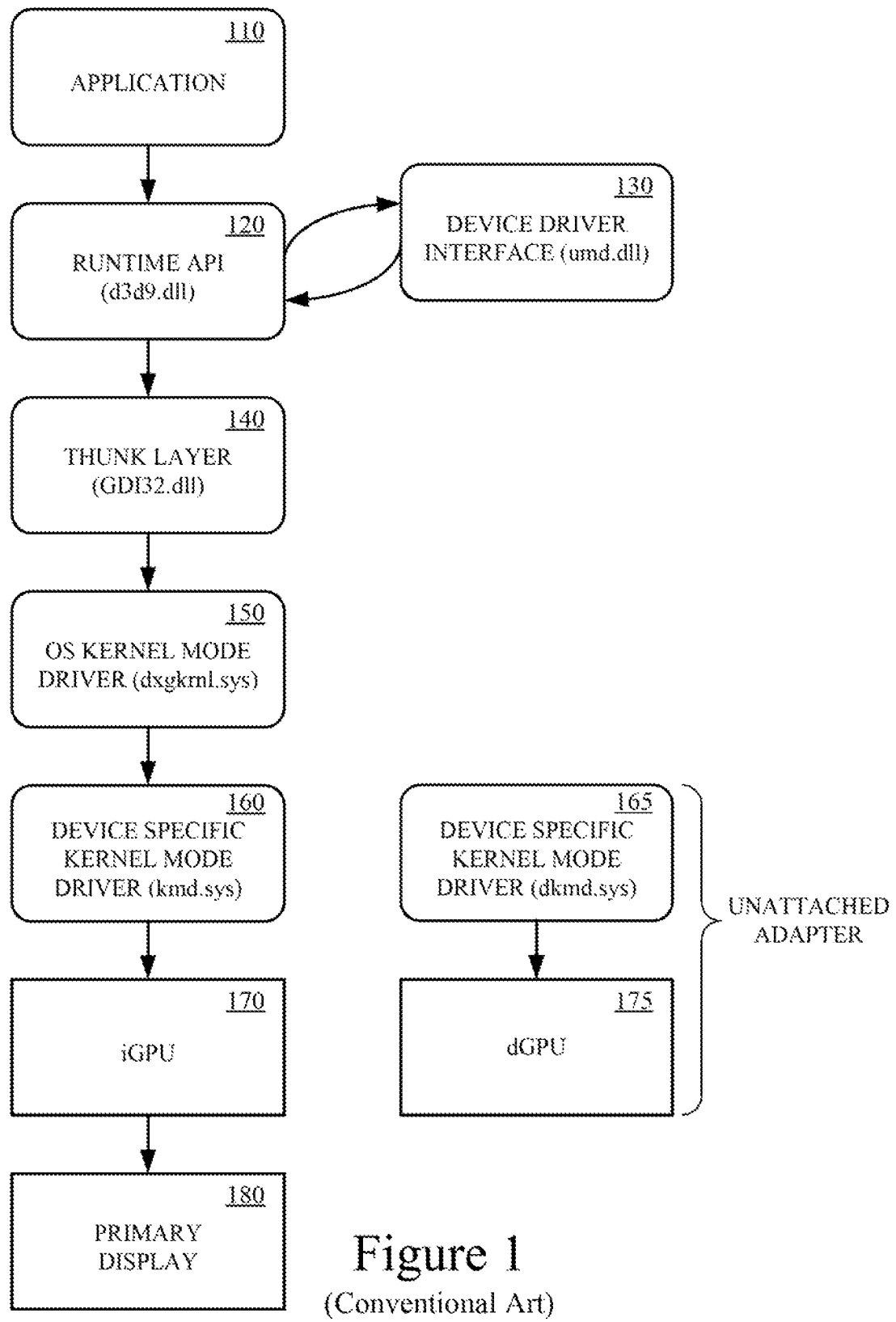
FIG. 1 shows a graphics processing technique according to the conventional art.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Figure 2:
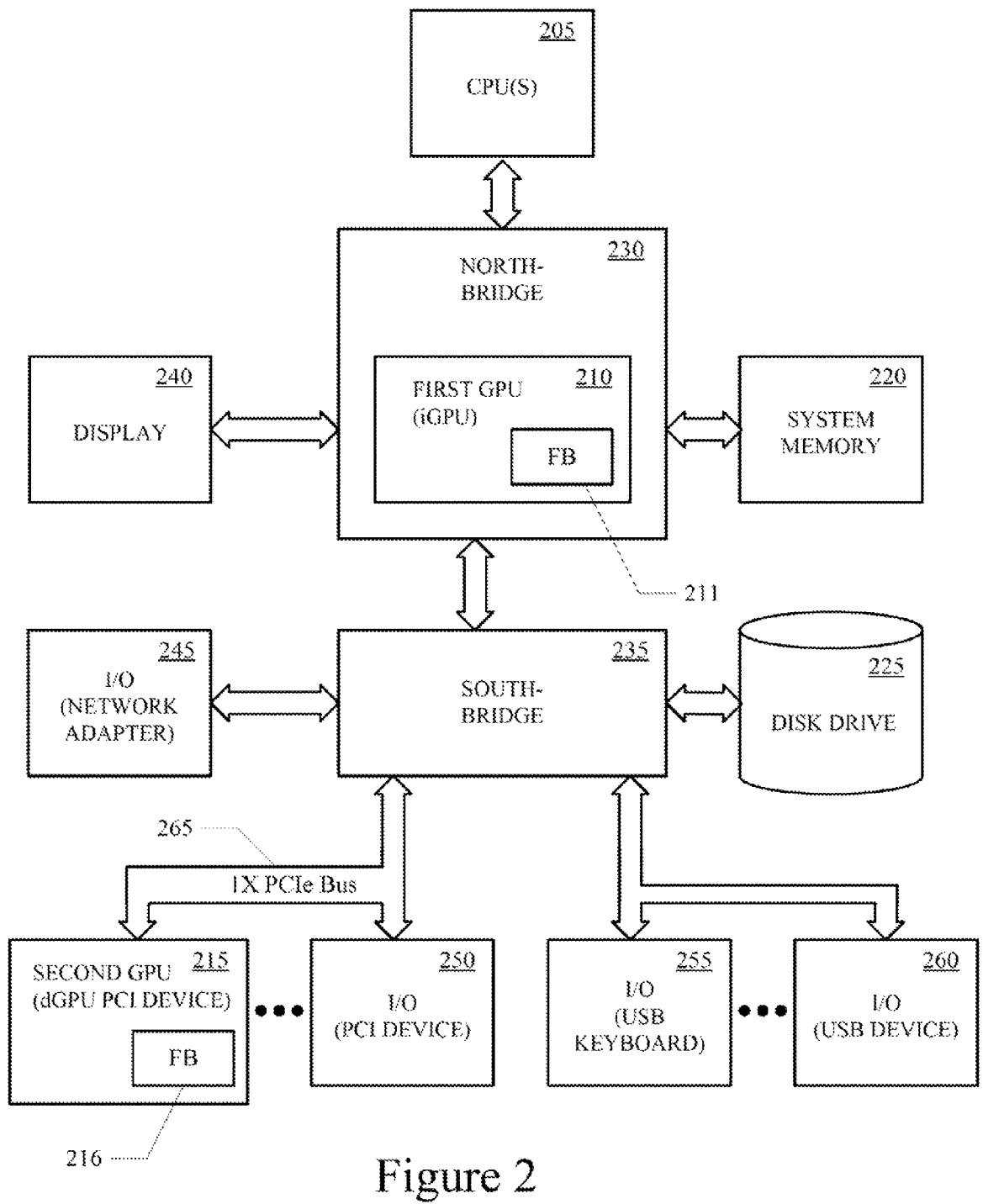
FIG. 2 shows a graphics co-processing computing platform, in accordance with one embodiment of the present technology.

Referring to FIG. 2, a graphics co-processing computing platform, in accordance with one embodiment of the present technology is shown. The exemplary computing platform may include one or more central processing units (CPUs) 205, a plurality of graphics processing units (GPUs) 210, 215, volatile and/or non-volatile memory (e.g., computer readable media) 220, 225, one or more chip sets 230, 235, and one or more peripheral devices 215, 240-260 communicatively coupled by one or more busses. The GPUs include heterogeneous designs. In one implementation, a first GPU may be an integral graphics processing unit (iGPU) and a second GPU may be a discrete graphics processing unit (dGPU). The chipset 230, 235 acts as a simple input/output hub for communicating data and instructions between the CPU 205, the GPUs 210, 215 the computing device-readable media 220, 225, and peripheral devices 215, 240-265. In one implementation, the chipset includes a northbridge 230 and southbridge 235. The northbridge 230 provides for communication between the CPU 205, system memory 220 and the southbridge 235. In one implementation, the northbride 230 includes an integral GPU. The southbridge 235 provides for input/output functions. The peripheral devices 215, 240-265 may include a display device 240, a network adapter (e.g., Ethernet card) 245, CD drive, DVD drive, a keyboard, a pointing device, a speaker, a printer, and/or the like. In one implementation, the second graphics processing unit is coupled as a discrete GPU peripheral device 215 by a bus 265 such as a Peripheral Component Interconnect Express (PCIe) bus.

In a number of computing platforms, the discrete graphics processing unit is coupled by a relatively high speed communication link (e.g., 16X PCIe bus). However, in some computing platforms, such laptop computers, tablet computers, netbooks, smartphones and the like, a slower communication link (e.g., 1X PCIe bus) may be used to reduce costs. For example, the discrete GPU 215 may be coupled to system memory 220, the CPU 205, and the chipset 230, 235 by a 1x PCIe bus 265. The 1x PCIe bus 265 provides a limited bandwidth (e.g., 200 MB/sec) as compared to a faster 16x PCIe link (e.g., 3 GB/sec).

The computing device-readable media 220, 225 may be characterized as primary memory and secondary memory. Generally, the secondary memory, such as a magnetic and/or optical storage, provides for non-volatile storage of computer-readable instructions and data for use by the computing device. For instance, the disk drive 225 may store the operating system (OS), applications, utilities, routines, drivers, and data. The primary memory, such as the system memory 220 and/or graphics memory, provides for volatile storage of computer-readable instructions and data for use by the computing device. For instance, the system memory 220 may temporarily store a portion of the operating system, a portion of one or more applications, utilities, routines, drivers and associated data that are currently used by the CPU 205, GPU 210 and the like. In addition, the GPUs 210, 215 may include integral or discrete frame buffers 211, 216.

Figure 3:
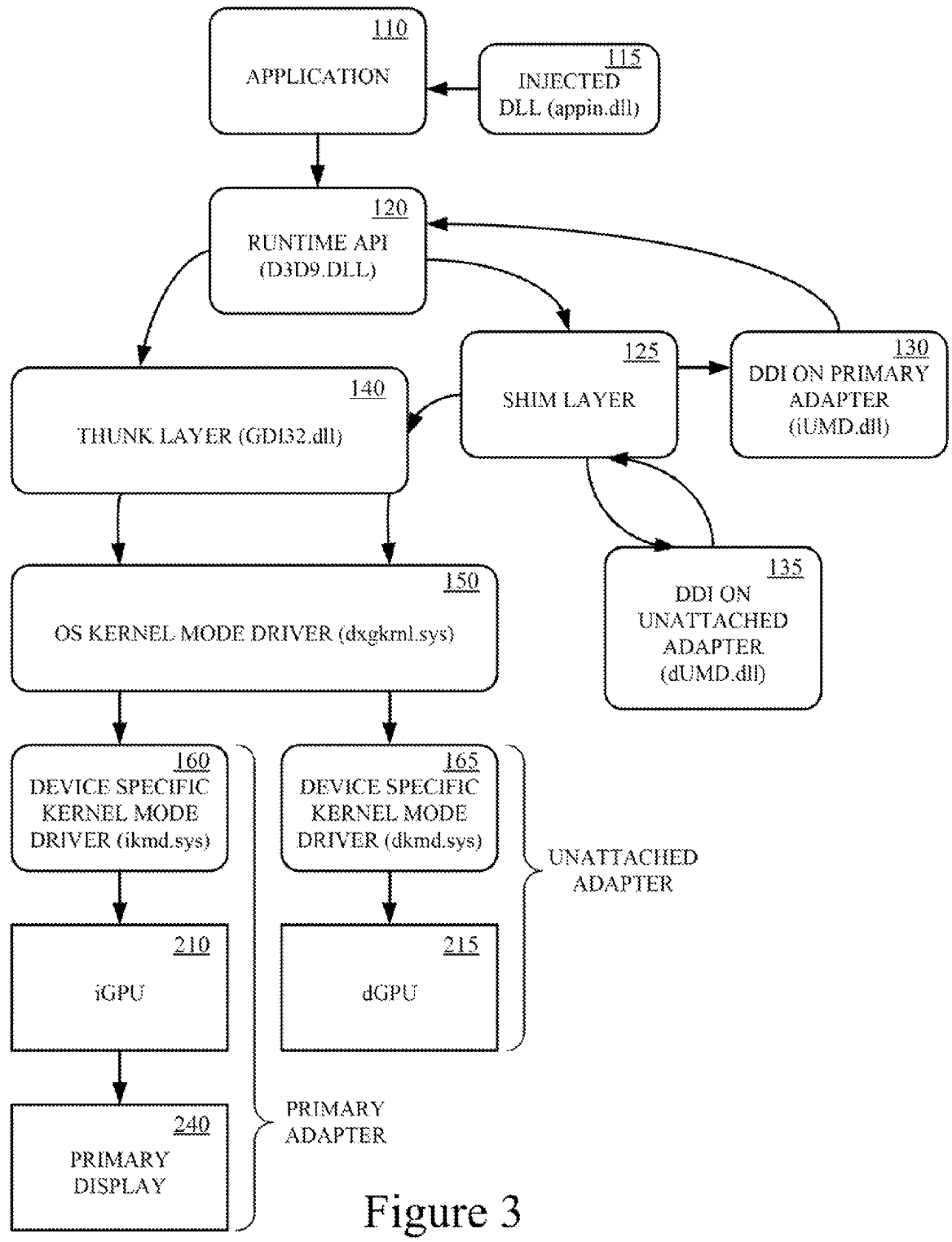
FIG. 3 shows a graphics co-processing technique, in accordance with one embodiment of the present technology.

Referring to FIG. 3, a graphics co-processing technique, in accordance with one embodiment of the present technology, is shown. When an application 110 starts, it calls the user mode level runtime application programming interface (e.g., DirectX API d3d9.dll) 120 to determine what display adapters are available. In addition, an application initialization routine is injected when the application starts. In one implementation, the application initialization routine is a short dynamic link library (e.g., appin.dll). The application initialization routine injected in the application includes some entry points, one of which includes a call (e.g., set_dll_searchpath( )) to change the search path for the display device driver interface. During initialization, the search path for the device driver interface (e.g., c:\windows\system32\ . . . \umd.dll) is changed to the search path of a shim layer library (e.g., c:\ . . . \coproc\ . . . \umd.dll). Therefore the runtime API 120 will search for the same DDI name but in a different path, which will result in the runtime API 120 loading the shim layer 125.

The shim layer library 125 has the same entry points as a conventional display driver interface (DDI). The runtime API 120 passes one or more function pointers to the shim layer 125 when calling into the applicable entry point (e.g., OpenAdapter( )) in the shim layer 125. The function pointers passed to the shim layer 125 are call backs into the runtime API 120. The shim layer 125 stores the function pointers. The shim layer 125 loads and initializes the DDI on the primary adapter 130. The DDI on the primary adapter 130 returns a data structure pointer to the shim layer 125 representing the attached adapter. The shim layer 125 also loads and initializes the device driver interface on the unattached adapter 135 by passing two function pointers which are call backs into local functions of the shim layer 125. The DDI on the unattached adapter 135 also returns a data structure pointer to the shim layer 125 representing the unattached adapter. The data structure pointers returned by the DDI on the primary adapter 130 and unattached adapter 135 are stored by the shim layer 125. The shim layer 125 returns to the runtime API 120 a pointer to a composite data structure that contains the two handles. Accordingly, the DDI on the unattached adapter 135 is able to initialize without talking back to the runtime API 120.

In one implementation, the shim layer 125 is an independent library. The independent shim layer may be utilized when the primary GPU/display and the secondary GPU are provided by different vendors. In another implementation, the shim layer 125 may be integral to the display device interface on the unattached adapter. The shim layer integral to the display device driver may be utilized when the primary GPU/display and secondary GPU are from the same vendor.

The application initialization routine (e.g., appin.dll) injected in the application also includes other entry points, one of which includes an application identifier. In one implementation, the application identifier may be the name of the application. The shim layer 125 application makes a call to the injected application initialization routine (e.g., appin.dll) to determine the application identifier when a graphics command is received. The application identifier is compared with the applications in a white list (e.g., a text file). The white list indicates an affinity between one or more applications and the second graphics processing unit. In one implementation, the white list includes one or more applications that would perform better if executed on the second graphics processing unit.

If the application identifier is not on the white list, the shim layer 125 calls the device driver interface on the primary adapter 130. The device driver interface on the primary adapter 130 sets the command buffers. The device driver interface on the primary adapter then calls, through the runtime 120 and a thunk layer 140, to the operating system kernel mode driver (e.g., DirectX driver dxgkrnl.sys) 150. The operating system kernel mode driver 160 in turn schedules the graphics command with the device specific kernel mode driver (e.g., kmd.sys) 160 for the GPU 210 attached to the primary display 240. The GPU 210 attached to the primary display 240 is also referred to hereinafter as the first GPU. The device specific kernel mode driver 160 sets command register of the GPU 210 to execute the graphics command on the GPU 210 (e.g., integral GPU) attached to the primary display 240.

If the application identifier is a match to one or more identifiers on the white list, the handle from the runtime API 120 is swapped by the shim layer 125 with functions local to the shim layer 125. For a rendering command, the local function stored in the shim layer 125 will call into the DDI on the unattached adapter 135 to set the command buffer. In response, the DDI on the unattached adapter 135 will call local functions in the shim layer 125 that route the call through the thunk layer 140 to the operating system kernel mode driver 150 to schedule the rendering command. The operating system kernel mode driver 150 calls the device specific kernel mode driver (e.g., dkmd.sys) 165 for the GPU on the unattached adapter 215 to set the command registers. The GPU on the unattached adapter 215 (e.g., discrete GPU) is also referred to hereinafter as the second GPU. Alternatively, the DDI on the unattached adapter 135 can call local functions in the thunk layer 140. The thunk layer 140 routes the graphics request to the operating system kernel mode driver (e.g., DirectX driver dxgkrnl.sys) 150. The operating system kernel mode driver 150 schedules the graphics command with the device specific kernel mode driver (e.g., dkmd.sys) 165 on the unattached adapter. The device specific kernel mode driver 165 controls the GPU on the unattached adapter 215.

For a display related command (e.g., Present( )), the shim layer 125 splits the display related command received from the application 110 into a set of commands for execution by the GPU on the unattached adapter 215 and another set of commands for execution by the GPU on the primary adapter 210. In one implementation, when the shim layer 125 receives a present call from the runtime 120, the shim layer 125 calls to the DDI on the unattached adapter 135 to cause a copy from the frame buffer 216 of the GPU on the unattached adapter 215 to a corresponding buffer in system memory 220. The shim layer 125 will also call the DDI on the primary adapter 130 to cause a copy from the corresponding buffer in system memory 220 to the frame buffer 211 of the GPU on the attached adapter 210 and then a present by the GPU on the attached adapter 210. The memory accesses between the frame buffers 211, 216 and system memory 220 may be direct memory accesses (DMA). To synchronize the copy and presents on the GPUs 210, 215, a display thread is created, that is notified when the copy to system memory by the second GPU 215 is done. The display thread will then queue the copy from system memory 220 and the present call into the GPU on the attached adapter 210.

Figure 4:
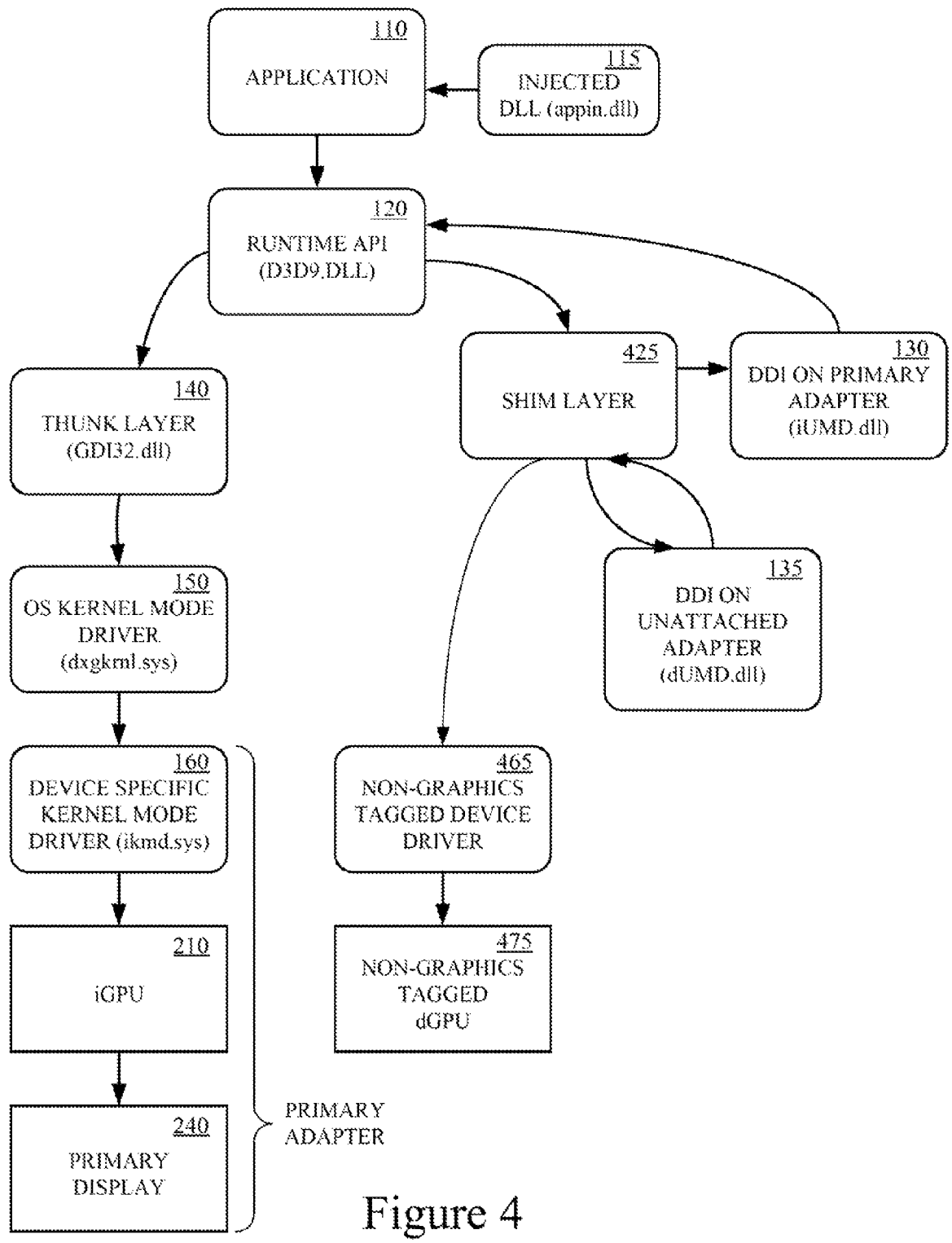
FIG. 4 shows a graphics co-processing technique, in accordance with another embodiment of the present technology.

In another implementation, the operating system (e.g., Window7Starter) will not load a second graphics driver 165. Referring now to FIG. 4, a graphics co-processing technique, in accordance with another embodiment of the present technology, is shown. When the operation system will not load a second graphics driver, the second GPU 475 is tagged as a non-graphics device adapter that has its own driver 465. Therefore the second GPU 475 and its device specific kernel mode driver 465 are not seen by the operating system as a graphics adapter. In one implementation, the second GPU 475 and its driver 465 are tagged as a memory controller. The shim layer 125 loads and configures the DDI 130 for the first GPU 210 on the primary adapter and the DDI 135 for the second GPU 475 If there is a specified affinity for executing rendering commands from the application 110 on the second GPU 475, the shim layer 125 intercepts the rendering commands sent by the runtime API 120 to the DDI on the primary adapter 130, calls the DDI on the unattached adapter to set the commands buffers for the second GPU 475, and routes them to the driver 465 for the second GPU 475. The shim layer 125 also intercepts the callbacks from the driver 465 for the second GPU 475 to the runtime 120. In another implementation, the shim layer 125 implements the DDI 135 for the second GPU 475. Accordingly, the shim layer 125 splits graphics command and redirects them to the two DDIs 130, 135.

Accordingly, the embodiments described with reference to FIG. 3, enables the application to run on a second GPU instead of a first GPU when the particular version of the operating system will allow the driver for the second GPU to be loaded but the runtime API will not allow a second device driver interface to be initialized. The embodiments described with reference to FIG. 4 enables an application to run on a second GPU, such as a discrete GPU, instead of a first GPU, such as an integrated GPU, when the particular version of the operation system (e.g., Win7Starter) will not allow the driver for the second GPU to be loaded. The DDI 135 for the second GPU 475 cannot talkback through the runtime 120 or the thunk layer 140 to a graphics adapter handled by an OS specific kernel mode driver.

Figure 5A:
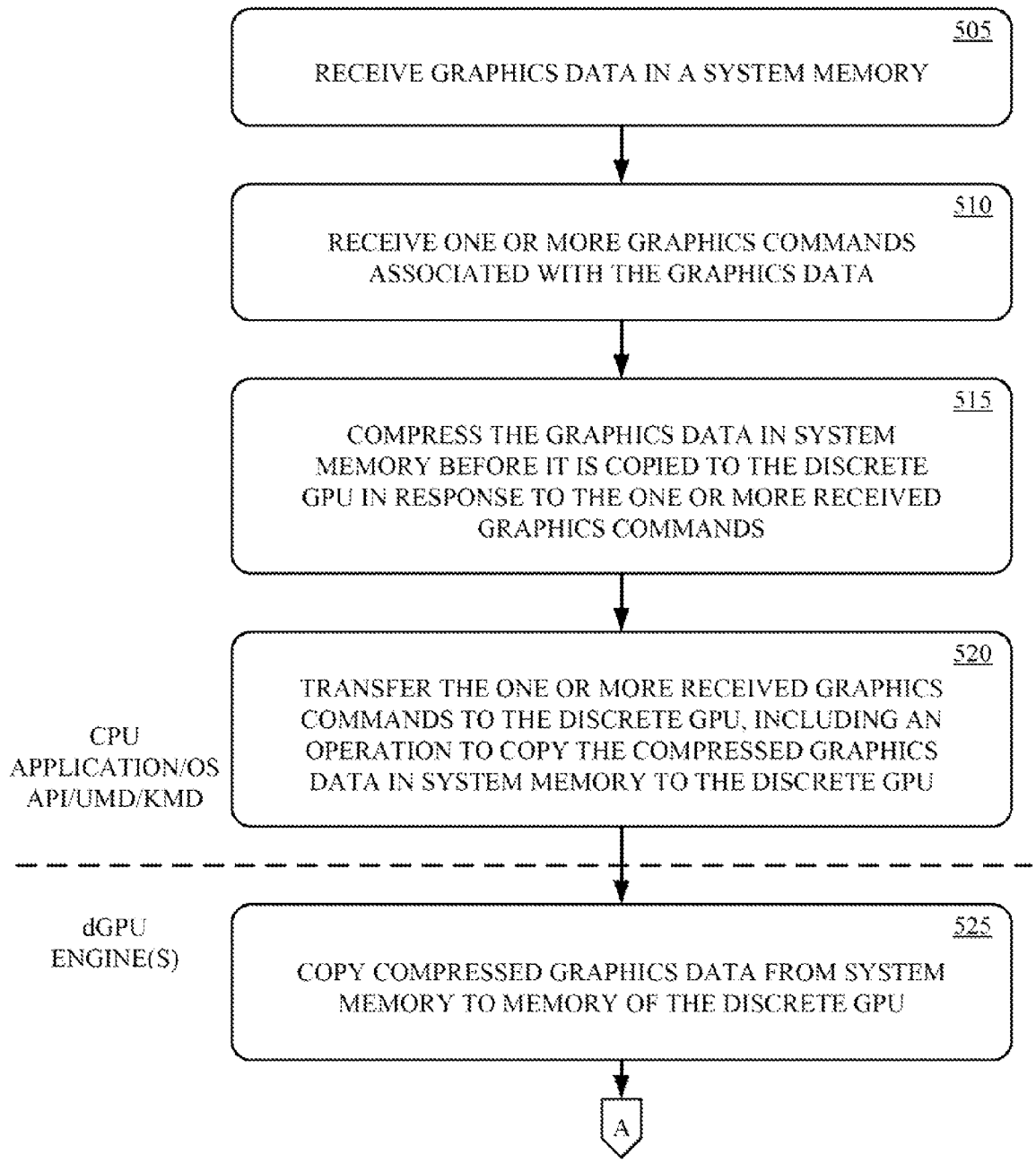
FIGS. 5A and 5B show a method of transferring graphics data from system memory to a discrete GPU, in accordance with one embodiment of the present technology.
Figure 5B:
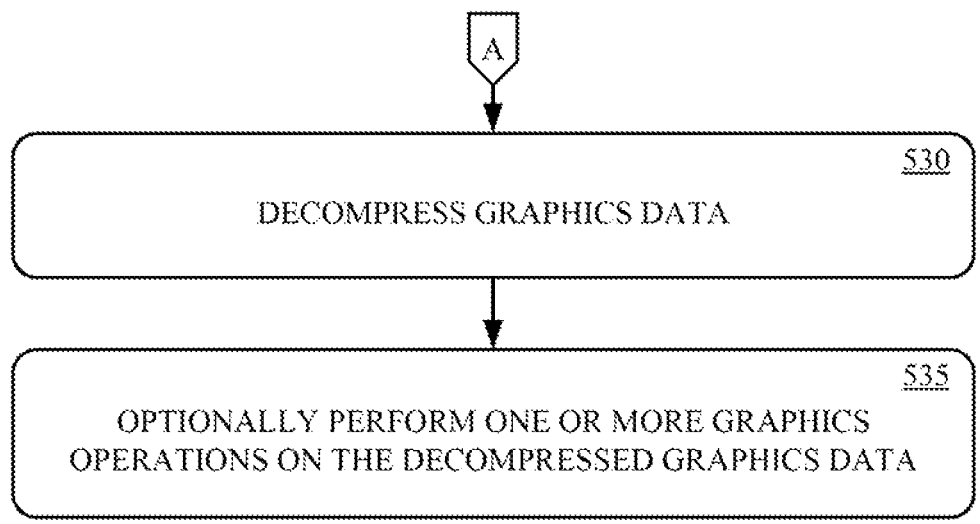

Referring now to FIGS. 5A and 5B, a method of transferring graphics data from system memory to a discrete GPU, in accordance with one embodiment of the present technology, is shown. The method begins with receiving graphics data in a system memory, at 505. In one implementation, an application causes graphics data to be loaded into system memory. For example, an application may cause graphics data from a mass storage device such as a hard disk drive, optical disk drive (e.g., DVD drive) to be loaded into a vertex buffer, an index buffer, a shading/lighting buffer, a texture buffer, and/or the like, of the system memory. At 510, one or more graphics commands associated with the graphics data are received. The graphics commands received from the application specify one or more graphics operations utilizing the graphics data, including an operation to copy the graphics data in system memory to the discrete GPU.

At 515, the graphics data in the system memory is compressed before the graphics data is copied to the discrete GPU, in response to receiving the one or more graphics operations associated with the graphics data. In one implementation, the user mode driver applies Lempel-Ziv-Oberhumer (LZO) or similar compression to the graphics data in the system memory. The LZO compression is a lossless block compression algorithm that provides approximately a 40% reduction in the graphics data.

In an optional implementation, the graphics data in system memory may be compressed as slices. Each slice may be compressed by a corresponding thread. Alternatively, each slice may be compressed by a corresponding CPU core. Compressing slices of graphics data speeds up the compression process.

At 520, the one or more received graphics commands are transferred to the discrete GPU. In one implementation, one or more command buffers of the discrete GPU are loaded with byte code for executing the one or more graphics commands associated with the graphics data. For example, a user mode driver (umd), operating system, kernel mode driver (kmd), and/or the like, loads one or more command buffers of the discrete GPU with a collection of identifiers and arguments specifying an operation to copy the compressed graphics data in system memory into a frame buffer of the discrete GPU. One or more arguments may specify the location (e.g., base address and offset) of the graphics data in system memory. One or more other arguments may specify a location in a frame buffer of the discrete GPU for storing the graphics data. One or more identifiers may specify a direct memory access blitting of the graphics data from the location in system memory to the location in the frame buffer. One or more other identifiers may specify that the graphics data in system memory is compressed and optionally the type of compression.

At 525, the compressed graphics data is copied from the system memory to memory of the discrete GPU. In one implementation, a copy engine of the discrete GPU performs a direct memory access (DMA) transfer of the compressed graphics data in system memory in response to the applicable identifies and arguments in the command buffer. At 530, the compressed graphics data copied to memory of the discrete GPU is decompressed. In one implementation, a decoder engine or similar engine of the discrete GPU applies Lempel-Ziv-Oberhumer (LZO) decompression or another corresponding decompression algorithm to the graphics data. The decompressed graphics data may be stored in the frame buffer at the location specified by one or more identifiers and/or arguments in the command buffer.

Although the copy process and the decompression process are described as separate processes, it is appreciated that LZO decompression and other corresponding decompression algorithms can be performed in-line with the copy operation so that the decompressed graphics data is stored directly in the frame buffer. In addition, if the graphics data was compressed as slices, the compressed slices of graphics data may be decompressed in corresponding order. Furthermore, the decompression can be performed by the discrete GPU in parallel with some ongoing rendering.

If the discrete GPU is coupled to the CPU and system memory by a relatively slow communication link, such as a 1x PCIe bus, the compression advantageously reduces the time that it takes to copy the graphics data from system memory to the discrete GPU. For example, if 100 MB of uncompressed graphics data is transferred at 20 MB/sec across a 1X PCIe, it will take approximately 0.5 seconds to copy the graphics data from the system memory to the frame buffer of the discrete GPU. However, the 40 MB of compressed graphics data in accordance with embodiments of the present technology may be transferred across the same 20 MB/sec 1X PCIe link in approximately 0.2 seconds.

At 535, the method may continue with performing one or more operations on the decompressed graphics data. In one implementation, one or more engines of the discrete GPU perform one or more operations on the decompressed graphics data in the frame buffer. For example, the operations may render graphics primitives from the graphics data in the frame buffer.

Figure 6A:
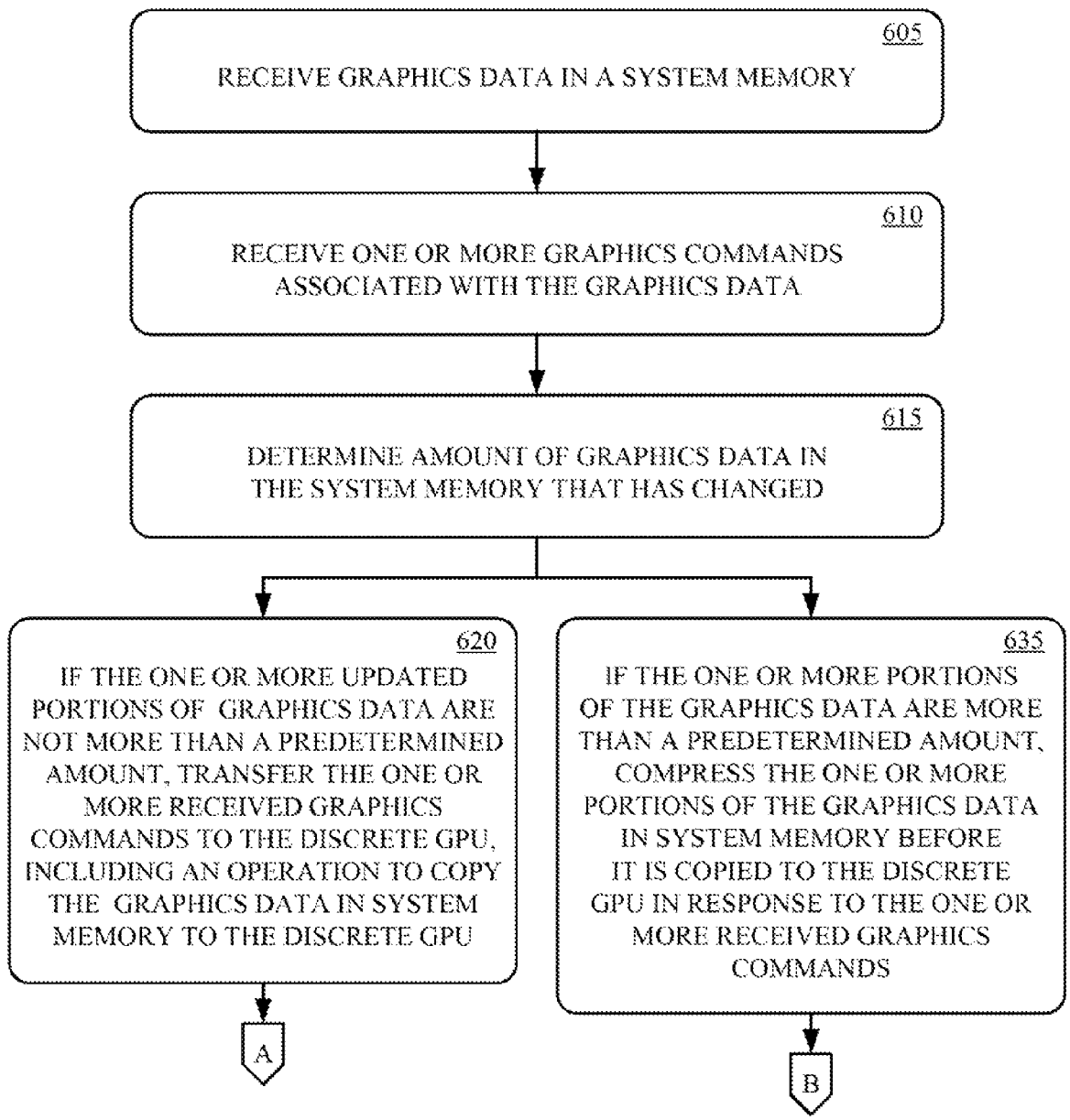
FIGS. 6A-6C show a method of transferring graphics data from system memory to a discrete GPU, in accordance with another embodiment of the present technology.
Figure 6B:
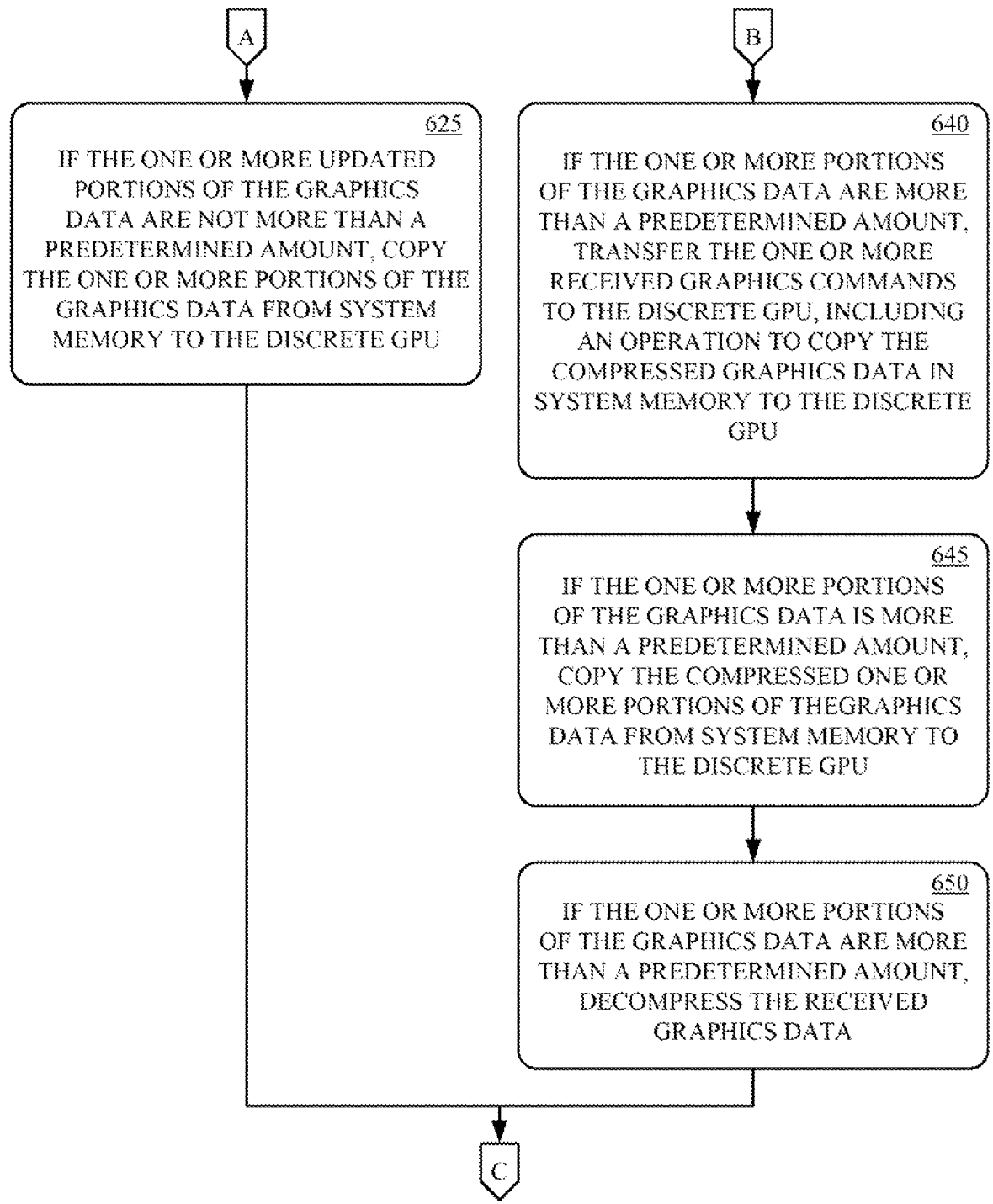
Figure 6C:
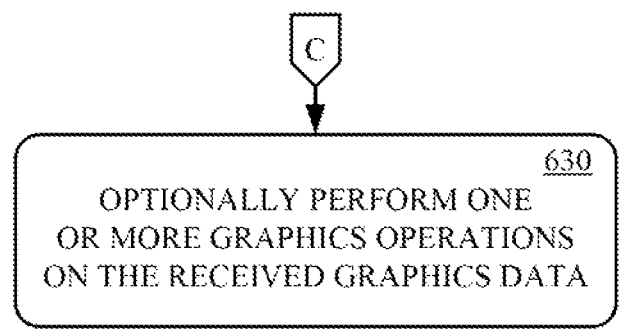

Referring now to FIGS. 6A-6C, a method of transferring graphics data in system memory to a discrete GPU, in accordance with another embodiment of the present technology, is shown. The method begins with receiving updates to graphics data in a system memory, at 605. In some cases the graphics data may involve a large amount of data. However, only a small fraction of the data might have actually have been modified. Therefore it may be advantageous to track the updates to the graphics data. In one implementation, a lock call and a write/watch call may be received prior to one or more writes to portion of the graphics data. After the updates to the graphics data are written to the system memory a stop/watch call and a unlock call are received. In response to the write/watch call a set of dirty bits are set to their modified state for each page that is the target of a write operation. At 610, one or more graphics commands associated with the graphics data are received. The graphics commands received from the application specify one or more graphics operations utilizing the graphics data. At 615, the amount of graphics data that has been updated in the system memory is determined. In one implementation, the graphics driver (e.g., umd, kmd, and or the like) reads the dirty bits in response to the unlock call to determine which pages were modified. The graphics driver may be configured with a minimum block size (e.g., number of pages) for transfer operations and may initiate a compressed or uncompressed direct memory access (DMA) blit, as described below, for each block of pages that contains at least one modified page. The minimum block size may be selected based on an efficiency tradeoff between using a large number of small direct memory access blit operations.

If one or more updated portions of the graphics data are not more than a predetermined amount, the one or more received graphics commands are transferred to the discrete GPU, at 620. In one implementation, one or more command buffers of the discrete GPU are loaded with byte code for executing the one or more graphics commands associated with the graphics data including an operation to copy the compressed graphics data in system memory to the discrete GPU.

If one or more updated portions of the graphics data are not more than a predetermined amount, the graphics data is copied from the system memory to the discrete GPU, at 625. In one implementation, a copy engine of the discrete GPU performs a direct memory access (DMA) transfer of the graphics memory in system memory in response to the applicable identifies and arguments in the command buffer. At 630, the method may continue with performing operations on the graphics data. In one implementation, one or more engines of the discrete GPU perform one or more operations on the graphics data in the frame buffer. For example, the operations may render graphics primitives from the graphics data in the frame buffer.

If the one or more updated portions of the graphics data are more than a predetermined amount, the updated portions of the graphics data in the system memory are compressed, at 635, before being copied to the discrete GPU. The compression may be triggered upon an unlock call from the application, or by memory watching assisted by some operating system primitive. In one implementation, the user mode driver applies Lempel-Ziv-Oberhumer (LZO) or similar compression to the updated portions of the graphics data in the system memory. The LZO compression is a lossless block compression algorithm that provides approximately a 40% reduction in data.

In an optional implementation, the updated portions of the graphics data may be compressed as slices. Each slice may be compressed by a corresponding thread. Alternatively, each slice may be compressed by a corresponding CPU core. Compressing slices of data speeds up the compression process.

If the one or more updated portions of the graphics data are more than a predetermined amount, the one or more received graphics commands are transferred to the discrete GPU, at 640. The transferred graphics commands include an operation to copy the compressed graphics data updates in system memory to the discrete GPU. In one implementation, one or more command buffers of the discrete GPU are loaded with byte code for executing the one or more graphics commands associated with the graphics data. For example, a user mode driver (umd), operating system, kernel mode driver (kmd), and/or the like, loads one or more command buffers of the discrete GPU with a collection of identifiers and arguments specifying an operation to copy the compressed graphics data updates in system memory into the frame buffer of the discrete GPU. One or more arguments may specify the location (e.g., base address and offset) of the compressed graphics data updates in system memory. One or more other arguments may specify a location in a frame buffer of the discrete GPU for storing the graphics data updates. One or more identifiers may specify a direct memory access transfer of the graphics data updates from the location in system memory to the location in the frame buffer. One or more other identifiers may specify that the one or more graphics data updates in memory are compressed and optionally the type of compression.

If the one or more updated portions of the graphics data are more than a predetermined amount, the one or more compressed graphics data updates are copied from the system memory to the discrete GPU, at 645. In one implementation, a copy engine of the discrete GPU performs a direct memory access (DMA) transfer of the compressed graphics data updates in system memory in response to the applicable identifies and arguments in the command buffer. At 650, the one or more compressed graphics data updates copied to the discrete GPU are decompressed. In one implementation, a decoder engine or similar engine of the discrete GPU applies Lempel-Ziv-Oberhumer (LZO) decompression or another corresponding decompression algorithm to the graphics data updates. The decompressed graphics data updates may be stored in the frame buffer at the location specified by one or more identifiers and/or arguments in the command buffer.

Although the copy process and decompression process are described as separate processes, it is appreciated that LZO decompression and other corresponding decompression algorithms can be performed in-line with the copy operation so that the decompressed graphics data updates are stored directly in the frame buffer. In addition, if the graphics data updates were compressed as slices, the compressed slices of graphics data may be decompressed in corresponding order. Furthermore, the decompression can be performed by the discrete GPU in parallel with some ongoing rendering.

Again, if the discrete GPU is coupled to the CPU and system memory by a relatively slow communication link, such as a 1x PCIe bus, the compression advantageously reduces the time that it takes to copy the graphics data from system memory to the discrete GPU.

Again, the method may continue with performing operations on the graphics data, at 630. In one implementation, one or more engines of the discrete GPU perform one or more operations on the graphics data including one or more updates. For example, the operations may render graphics primitives from the graphics data in the frame buffer.

Accordingly, embodiments of the present technology utilize compression of graphics data in the system memory before copying from system memory to memory of a discrete GPU to advantageously reduce traffic on the bus coupling the CPU and system memory to the discrete GPU.

Figure 7:
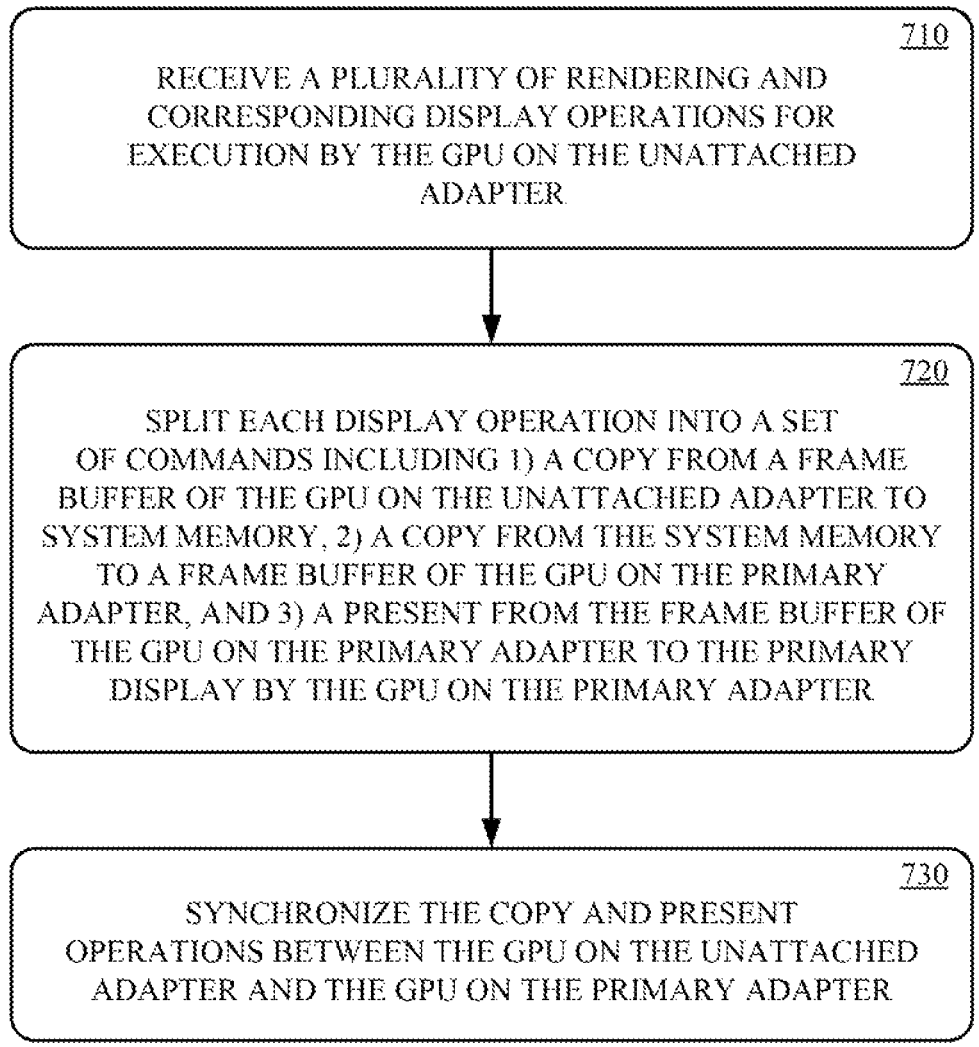
FIG. 7 shows a method of synchronizing copy and present operations on a first and second GPU, in accordance with one embodiment of the present technology.
Figure 8:
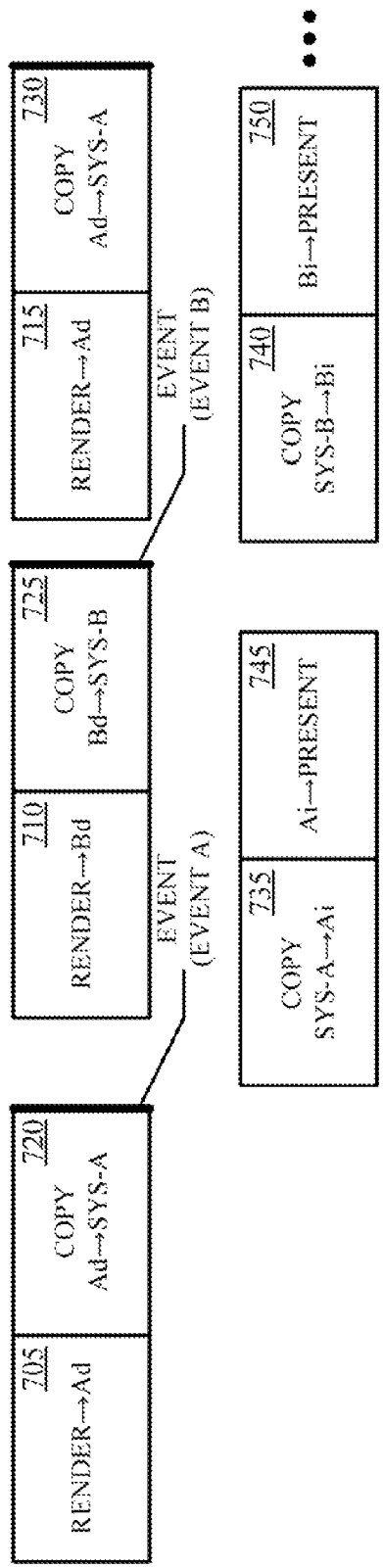
FIG. 8 shows an exemplary set of render and display operations, in accordance with one embodiment of the present technology.

Generally, display data is generated by the discrete GPU after processing the graphics data and commands. If the discrete GPU is attached to a display device, the display data may be output by the discrete GPU to the display device. If the discrete GPU is not attached to the display device, the display data may be transferred to the integrated GPU for output on the display attached to the integrated GPU. Referring now to FIG. 7, a method of synchronizing the copy and present operations on the first and second GPUs is shown. The method is illustrated in FIG. 8 with reference to an exemplary set of render and display operations, in accordance with one embodiment of the present technology. At 710, the shim layer 125 receives a plurality of rendering 805-815 and display operations for execution by the GPU on the unattached adapter 215. At 720, the shim layer 125 splits each display operation into a set of commands including 1) a copy 820-830 from a frame buffer 216 of the GPU on the unattached adapter 215 to a corresponding buffer in system memory 220 having shared access with the GPU on the attached adapter 210, 2) a copy 835, 840 from the buffer in shared system memory 220 to a frame buffer of the GPU on the primary adapter 210, and 3) a present 845, 850 on the primary display 240 by the GPU on the primary adapter 210. At 730, the copy and present operations on the first and second GPUs 210, 215 are synchronized.

The frame buffers 211, 216 and shared system memory 220 may be double or ring buffered. In a double buffered implementation, the current rendering operations is stored in a given one of the double buffers 805 and the other one of the double buffers is blitted to a corresponding given one of the double buffers of the system memory. When the rendering operation is complete, the next rendering operation is stored in the other one of the double buffers and the content of the given one of the double buffers is Witted 820 to the corresponding other one of the double buffers of the system memory. The rendering and blitting alternate back and forth between the buffers of the frame buffer of the second GPU 215. The blit to system memory is executed asynchronously. In another implementation, the frame buffer of the second. GPU 215 is double buffered and the corresponding buffer in system memory 220 is a three buffer ring buffer.

After the corresponding one of the double buffers of the frame buffer 216 in the second GPU 215 is blitted 820 to the system memory 220, the second GPU 210 generates an interrupt to the OS. In one implementation, the OS is programmed to signal an event to the shim layer 125 in response to the interrupt and the shim layer 125 is programmed to wait on the event before sending a copy command 835 and a present command 845 to the first GPU 210. In a thread separate from the application thread, referred to hereinafter as the display thread, the shim layer waits for receipt of the event indicating that the copy from the frame buffer to system memory is done, referred to herein after as the copy event interrupt. A separate thread is used so that the rendering commands on the first and second GPUs 210, 215 are not stalled in the application thread while waiting for the copy event interrupt. The display thread may also have a higher priority than the application thread.

A race condition may occur where the next rendering to a given one of the double buffers for the second GPU 215 begins before the previous copy from the given buffer is complete. In such case, a plurality of copy event interrupts may be utilized. In one implementation, a ring buffer and four events are utilized.

Upon receipt of the copy event interrupt, the display thread queues the blit from system memory 220 and the present call into the first GPU 210. The first GPU 210 blits the given one of the system memory 220 buffers to a corresponding given one of the frame buffers of the first GPU 210. When the blit operation is complete, the content of the given one of the frame buffers of the first GPU 210 is presented on the primary display 240. When the next copy and present commands are received by the first GPU 210, the corresponding other of the system memory 220 buffers is blitted into the other one of the frame buffers of the first GPU 210 and then the content is presented on the primary display 240. The blit and present alternate back and forth between, the double buffered frame buffer of the first GPU 210. The copy event interrupt is used to delay programming, thereby effectively delaying the scheduling of the copy from system memory 220 to the frame buffer of the first GPU 210 and presenting on the primary display 240.

In one implementation, a notification on the display side indicates that the frame has been present on the display 240 by the first GPU 210. The OS is programmed to signal an event when the command buffer causing the first GPU 210 to present its frame buffer on the display is done executing. The notification maintains synchronization where an application runs with vertical blank (vblank) synchronization.

Figure 9:
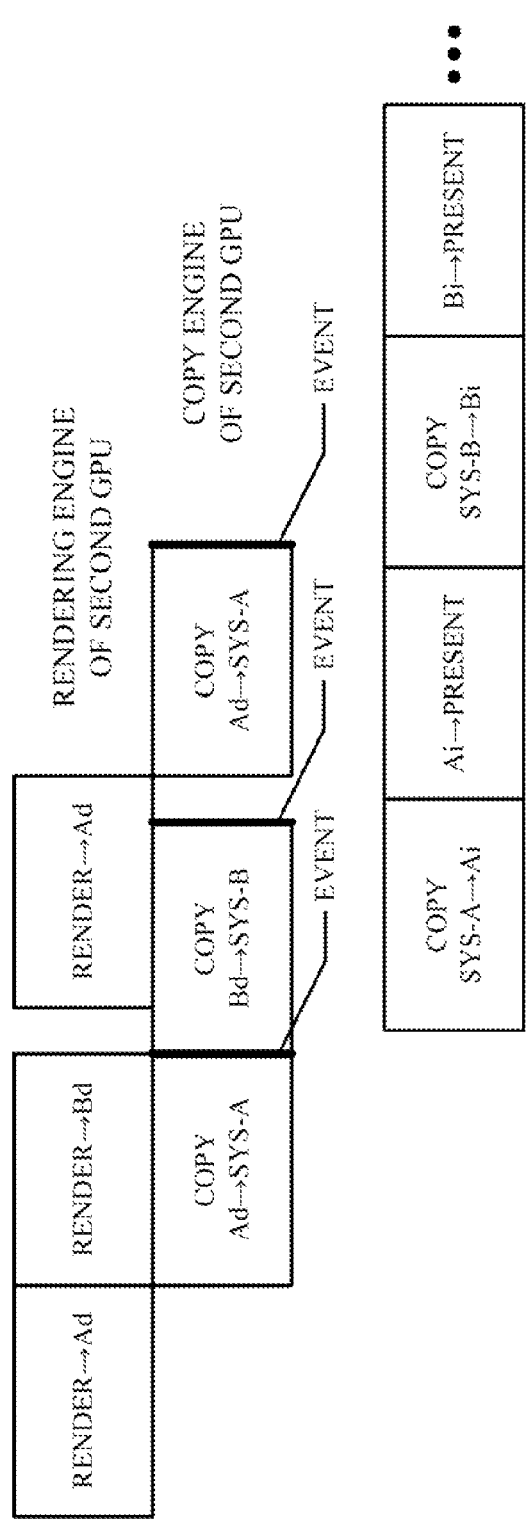
FIG. 9 shows an exemplary set of render and display operations, in accordance with another embodiment of the present technology.

Referring now to FIG. 9, an exemplary set of render and display operations, in accordance with another embodiment of the present technology, is shown. The rendering and copy operations executed on the second GPU 215 may be performed by different engines. Therefore, the rendering and copy operations may be performed substantially simultaneously in the second GPU 215.

Figure 10:
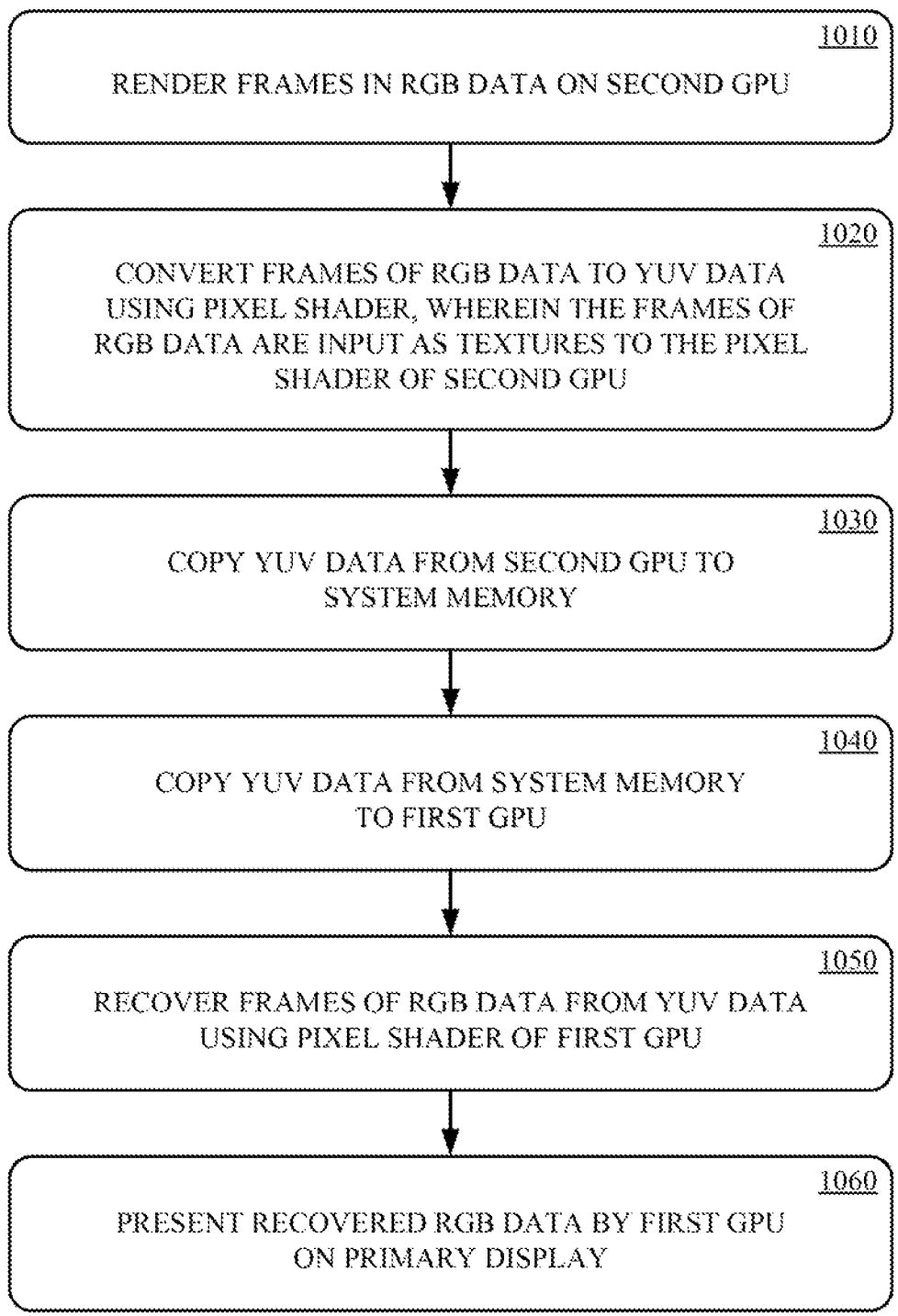
FIG. 10 shows a method of compressing rendered data, in accordance with one embodiment of the present technology.

Generally, the second GPU 215 is coupled to the system memory 220 by a bus having a relatively high bandwidth. However, in some systems the bus coupling the second GPU 215 may not provide sufficient bandwidth for blitting the frame buffer 216 of the second GPU 215 to system memory 220. For example, an application may be rendered at a resolution of 1280×1024 pixels. Therefore, approximately 5 MB/frame of RGB data is rendered. If the application renders at 100 frames/sec, than the second GPU needs approximately 500 MB/sec for blitting upstream to the system memory 220. However, a peripheral component interface express (PCIe) 1x bus typically used to couple the second GPU 215 system memory 220 has a bandwidth of approximately 250 MB/sec in each direction. Referring now to FIG. 10, a method of compressing rendered data, in accordance with one embodiment of the present technology is shown. The second GPU 215 renders frames of RGB data, at 1010. At 1020, the frames of RGB data are converted using a pixel shader in the second GPU 215 to YUV sub-sample data. The RGB data is processed as texture data by the pixel shader in three passes to generate YUV sub-sample data. In one implementation, the U and V components are sub-sampled spatially, however, the Y is not sub-sampled. The RGB data may be converted to YUV data using the 4.2.0 color space conversion algorithm. At 1030, the YUV sub-sample data is blitted to the corresponding buffers in the system memory with an asynchronous copy engine of the second GPU. The YUV sub-sample data is blitted from the system memory to buffers of the first GPU, at 1040. The YUV data is blitted to corresponding texture buffers in the second GPU. The Y, U, and V sub-sample data are buffered in three corresponding buffers, and therefore the copy from frame buffer of the second GPU 215 to the system memory 220 and the copy from system memory 220 to the texture buffers of first GPU 210 are each implemented by sets of three copies. The YUV sub-sample data is converted using a pixel shader in the first GPU 210 to recreate the RGB frame data, at 1050. The device driver interface on the attached adapter is programmed to render a full screened aligned quad from the corresponding texture buffers holding the YUV data. At 1060, the recreated RGB frame data is then presented on the primary display 240 by the first GPU 210. Accordingly, the shaders are utilized to provide YUV compression and decompression.

In one implementation, each buffer of Y, U and V samples is double buffered in the frame buffer of the second GPU 215 and the system memory 220. In addition, the Y, U and V samples copied into the first GPU 210 are double buffered as textures. In another implementation, the Y, U and V sample buffers in the second GPU 215 and corresponding texture buffers in the first GPU 210 are each double buffered. The Y, U and V sample buffered in the system memory 220 may each be triple buffered.

In one implementation, the shim layer 125 tracks the bandwidth needed for blitting and the efficiency of transfers on the bus to enable the compression or not. In another implementation, the shim layer 125 enables the YUV compression or not based on the type of application. For example, the shim layer 125 may enable compression for game application but not for technical applications such as a Computer Aided Drawing (CAD) application.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   loading and initializing a device driver interface and a device specific kernel mode driver for a an integrated graphics processing unit on a primary adapter;
   loading and initializing a device driver interface and a device specific kernel mode driver for the discrete graphics processing unit on an unattached adapter without the device driver interface talking back to a runtime application programming interface when a particular version of an operating system will not allow the device driver interface on the unattached adapter to be loaded;
   receiving graphics data in a system memory;
   receiving one or more graphics commands associated with the graphics data;
   compressing the graphics data in system memory in response to the one or more received graphics commands;
   transferring the one or more received graphics commands to the discrete graphics processing unit, wherein the one or more received graphics commands include an operation to copy the compressed graphics data to the discrete graphics processing unit;
   copying the compressed graphics data from the system memory to memory of the discrete graphics processing unit; and
   decompressing the compressed graphics data by the discrete graphics processing unit.

2. The method according to claim 1, wherein receiving graphics data in the system memory comprises loading, by an application, the graphics data from a mass storage device to the system memory.

3. The method according to claim 1, wherein one or more graphics commands comprise one or more operations to copy the graphics data in the system memory to the memory of the discrete graphics processing unit.

4. The method according to claim 1, wherein compressing, the graphics data comprises Lempel-Ziv-Oberhumer compressing the graphics data in the system memory.

5. The method according to claim 1, wherein compressing the graphics data comprises compressing each of a plurality of slices of the graphics data in the system memory.

6. The method according to claim 1, wherein transferring the one or more received graphics commands to the discrete graphics processing unit comprises loading one or more command buffers with one or more identifiers and one or more arguments specifying a direct memory access blitting of the compressed graphics data from the system memory to a frame buffer of the discrete graphics processing unit.

7. The method according to claim 1, wherein copying the compressed graphics data from the system memory to memory of the discrete graphics processing unit comprises a direct memory access blitting of the compressed graphics data from the system memory to a frame buffer of the discrete graphics processing unit.

8. The method according to claim 1, wherein the compressed graphics data is blitted from the system memory across a peripheral component interface express (PCIe) communication link to the frame buffer of the discrete graphics processing unit.

9. The method according to claim 1, wherein decompressing the compressed graphics data is performed in-line with copying the compressed graphics data from the system memory to memory of the discrete graphics processing unit.

10. The method according to claim 1, further comprising:
    injecting an application initialization routine, when an application starts, that includes an entry point that changes a search path for a display device interface to a search path of a shim layer library, and that includes an entry point that identities the application;
    loading the shim layer library, at the changed search path, that initializes the display device interface for the integrated graphics processing unit on the primary adapter and the display device interface for the discrete graphics processing unit on the unattached adapter, and that determines if the application has an affinity for execution of the graphics commands on the discrete graphics processing unit;
    splitting a display command, by the shim layer library, into a copy from a frame buffer of the discrete graphics processing unit to a buffer in the system memory, a copy from the buffer in the system memory to a frame buffer of the integrated graphics processing unit, and a present from the frame buffer of the integrated graphics processing unit on a display if there is an affinity.

11. One or more non-transitory computing device readable media having computing device executable instructions which when executed perform a method comprising:
    loading and initializing a device driver interface and a device specific kernel mode driver for a an integrated graphics processing unit on a primary adapter; and
    loading and initializing a device driver interface and a device specific kernel mode driver for the discrete graphics processing unit on an unattached adapter without the device driver interface talking back to a runtime application programming interface when a particular version of an operating system will not allow the device driver interface on the unattached adapter to be loaded;

receiving graphics data in a system memory;

receiving one or more graphics commands associated with the graphics data;

determining an amount of one or more portions of the graphics data in the system memory that have changed;

compressing the one or more portions of the graphics data in system memory, if the one or more portions of the graphics data that have changed are more than a predetermined amount;

transferring the one or more received graphics commands to the discrete graphics processing unit, wherein the one or more received graphics commands include an operation to copy the compressed graphics data to the discrete graphics processing, unit;

copying the compressed one or more portions of the graphics data from the system memory to memory of the discrete graphics processing unit, if the one or more portions of the graphics data that have changed are more than the predetermined amount; and decompressing the compressed one or more portions of the graphics data, if the one or more portions of the graphics data that have changed are more than the predetermined amount.

12. The one or more non-transitory computing device readable media having computing device executable instructions which when executed perform the method of claim 11, further comprising performing, by the discrete graphics processing unit, one or more graphics operations on the graphics data.

13. The one or more non-transitory computing device readable media having computing device executable instructions which when executed perform the method of claim 11, further comprising copying the one or more portions of the graphics data from the system memory to memory of the discrete graphics processing unit, if the one or more portions of the graphics data that have changed are not more than the predetermined amount.

14. The one or more non-transitory computing device readable media having computing device executable instructions which when executed perform the method of claim 11, wherein one or more graphics commands comprise one or more operations to copy the graphics data in the system memory to the memory of the discrete graphics processing unit.

15. The one or more non-transitory computing device readable media having computing device executable instructions which when executed perform the method of claim 11, wherein compressing the one or more portions of the graphics data comprises Lempel-Ziv-Oberhumer compressing, the one or more portions of the graphics data in the system memory that have changed.

16. The one or more non-transitory computing device readable media having computing device executable instructions which when executed perform the method of claim 15, wherein decompressing the compressed one or more portions of the graphics data comprises Lempel-Ziv-Oberhumer decompressing the one or more portions of the graphics data.

17. The one or more non-transitory computing device readable media having computing device executable instructions which when executed perform the method of claim 11, wherein compressing the one or more portions of the graphics data comprises compressing each of a plurality of slices of the one or more portions of the graphics data in the system memory.

18. The one or more non-transitory computing device readable media having computing device executable instructions which when executed perform the method of claim 11, wherein copying the compressed one or more portions of the graphics data from the system memory to memory of the discrete graphics processing unit comprises a direct memory access blitting of the compressed one or more portions of the graphics data from the system memory to a frame buffer of the discrete graphics processing unit.

19. A method comprising:

loading a device specific kernel mode driver of a discrete graphics processing unit tagged as a non-graphics device;

loading, and initializing a device driver interface and a device specific kernel mode driver for an integrated graphics processing unit on a primary adapter;

loading and initializing a device driver interface for the discrete graphics processing unit on a non-graphics device tagged adapter without the device driver interface talking back to a runtime application programming interface when a particular version of an operating system will not allow the device specific kernel mode driver for the discrete graphics processing unit to be loaded;

receiving graphics data in a system memory;

receiving one or more graphics commands associated with the graphics data;

compressing the graphics data in system memory in response to the one or more received graphics commands;

transferring the one or more received graphics commands to the discrete graphics processing unit, wherein the one or more received graphics commands include an operation to copy the compressed graphics data to the discrete graphics processing unit;

copying the compressed graphics data from the system memory to memory of the discrete graphics processing unit; and decompressing the compressed graphics data by the discrete graphics processing unit.

20. The method according to claim 19, wherein transferring the one or more received graphics commands to the discrete graphics processing unit comprises loading, one or more command buffers with one or more identifiers and one or more arguments specifying a direct memory access blitting of the compressed graphics data from the system memory to a frame buffer of the discrete graphics processing unit.

* * * * *